Figure 4:
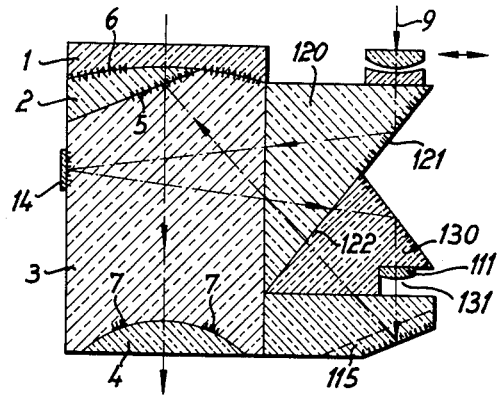

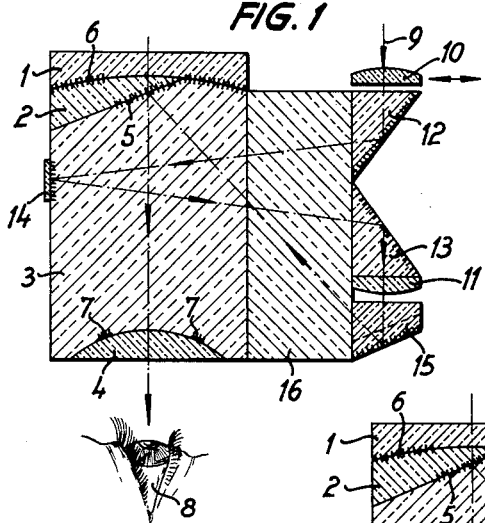
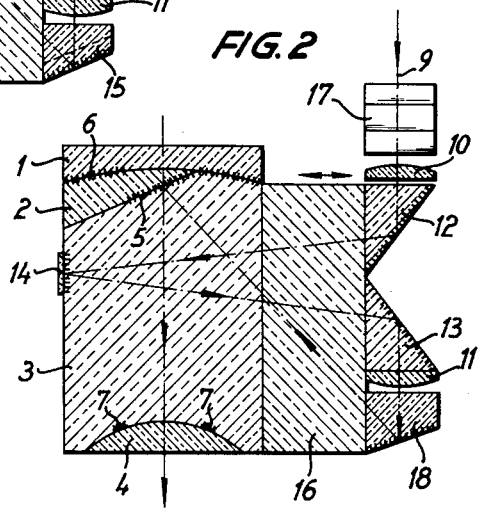
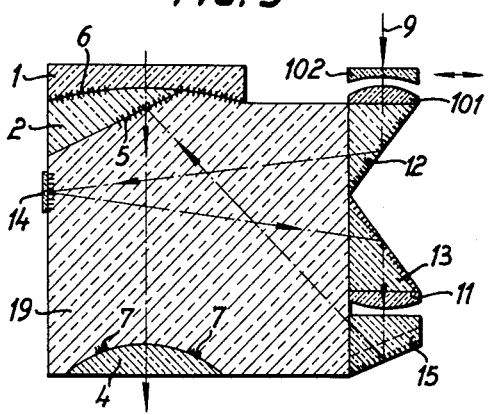

Friedrich Papke and
Friedrich Mische
INVENTORS

By Blum, Moscovitz, Friedman,
& Blum
attorneys

May 16, 1961

F. PAPKE ET AL 2,984,145

COMBINED RANGEFINDER AND ALBADA VIEWFINDER
UNIT FOR PHOTOGRAPHIC CAMERAS

Filed Oct. 20, 1959

4 Sheets-Sheet 3

Friedrich Papke and
Friedrich Mische
INVENTORS

By Blum, Moscovitz, Friedman
& Blum
Attorneys

Friedrich Papke and
Friedrich Mische
INVENTORS
By Blum, Moscovitz, Friedman, & Blum
Attorneys

United States Patent Office 2,984,145
Patented May 16, 1961

2,984,145

COMBINED RANGEFINDER AND ALBADA VIEW-FINDER UNIT FOR PHOTOGRAPHIC CAMERAS

Friedrich Papke and Friedrich Mische, Braunschweig-Gliesmarode, Germany, assignors to Voigtlander A.G., Braunschweig, Germany, a corporation of Germany Filed Oct. 20, 1959, Ser. No. 847,555

Claims priority, application Germany Oct. 21, 1958

15 Claims. (Cl. 88—2.4)

This invention relates to measuring finders for photographic cameras and it has particular relation to measuring finders including a viewfinder based on the Albada principle.

In the known measuring finders for photographic cameras range finders of various types are used. The simplest type of range finders which serve simultaneously as the viewfinder is the ground-glass view finder. The range finder objective is either identical with the picture-taking objective, e.g. in single lens reflex cameras, or, in addition to the picture-taking objective, a separate base objective is used, e.g. in twin-lens reflex cameras. In order to facilitate sharp focusing of the picture-taking objective, in both of the beforementioned cases a number of auxiliary means have been suggested. In another type of range finder, i.e. the split-field range finder, two systems yielding reel images are used and reflection is carried out over a relatively long base, whereby superposition of the images is observed in the real image plane of the objectives. Such instruments are frequently used for military purposes. Another type of measuring finders is called a coincidence range finder. In a simple example of this type, two virtual images are combined using a partially permeable mirror. These range finders, which are frequently used in photographic cameras, have the disadvantage that adjustment to coincidence is somewhat difficult, due to the lack of definition of the border of the reflected image, and is considerably dependent on the contrast of the sighted object. This difficulty arises particularly in finder systems with relatively small reduction of size or with a ratio of enlargement of 1:1. The entrance pupil of the measuring rays shows then a relative lack of sharpness. This disadvantage can be overcome by range finders in which only one virtual image is formed while the other image is real, whereby a sharp mutual definition of the images takes place. Such range finders which are designed as so-called measuring finders and form a unitary structure with a viewfinder of identical insight, have been known from the art.

The present invention relates to range finders of this last mentioned type, and has particular relation to a range finder, in which the reflected ray exhibits a real image and is coupled with a viewfinder based on the Albada principle. Thus, in principle, the invention is concerned with the combination of a coincidence range finder with a split-image range finder and with an Albada viewfinder.

It is difficult to combine range finders forming real and virtual images, and consisting of a reel telescope, with a viewfinder forming a non-real image, such as a Galilei or a Newton viewfinder, or a glass block having no optical properties. These difficulties are increased if, in addition to providing for reflecting the measuring ray into the field of view of the viewfinder, it is desirable to provide further reflections, such as for limiting the image field with respect to one or more objective focal lengths, and other purposes.

Such difficulties are caused particularly by the fact that a telescope providing real image consists of several optical elements and must contain means for erecting the image and obtaining laterally correct position of the image. Furthermore, as high precision manufacture and high mutual stability of the individual structural parts are necessary in range finders, only rather expensive range finders of this type, for photographic cameras, have become known hitherto.

In carrying out the present invention, image limitation of the reflected measuring ray is formed by the periphery of a mirror which is arranged in the plane of sharp focusing of both the telescope objective and telescope ocular. Thereby, the course of the beam for measuring the distance and the path of rays in the viewfinder extend relative to each other in such manner that the path of the measuring ray twice intersects the optical axis of the viewfinder. The mirror for limiting the image can be combined with the Albada finder and it is preferably cemented to the finder body, whereby it will be protected from being soiled or damaged. It is also an object of the present invention to combine the individual structural elements of the finder proper and of the measuring telescope into structural units, so that the instrument according to the invention consists practically of two parts only, i.e. (a) the range finder body proper and (b) a displaceable member which is preferably the objective lens of the measuring telescope or a part of the same.

According to a specific embodiment of the invention, the measuring finder is designed in such manner that the telescope ocular is formed by the ocular lens of the Albada finder in combination with a concave mirror, and this concave mirror is arranged on that prism which brings about reflection of the measuring ray from the limiting mirror to the partially permeable mirror within the Albada finder. It is also possible to use the path of rays for measuring finders in combination with finders of somewhat different form which include Newton-type-finders which have in known manner an air space between front lens and middle block. Although these finders as known show some undesirable reflections, they avoid the use of high-refractive glasses, which circumstance has sometimes to be considered from the standpoint of cost.

The appended drawings illustrate by way of example some specific embodiments of and best modes for carrying out the invention, to which the invention is not limited.

In the drawings—

Figure 5:
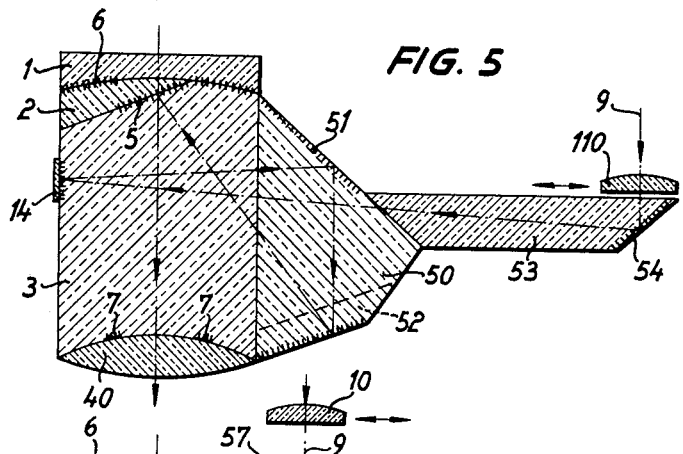
Figure 6:
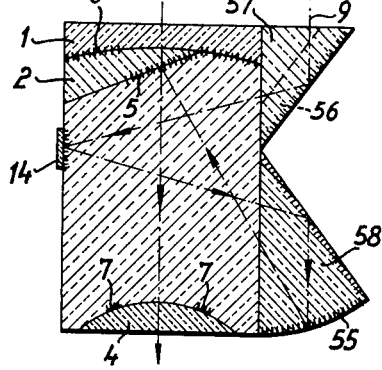
Figure 6A:
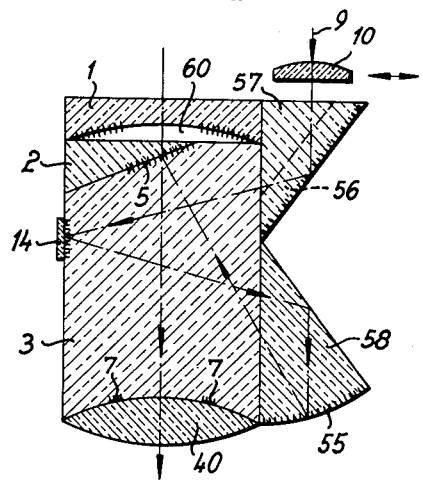
Figure 7A:
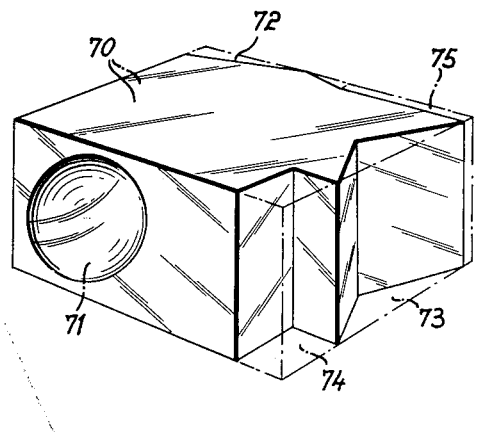
Figure 7:
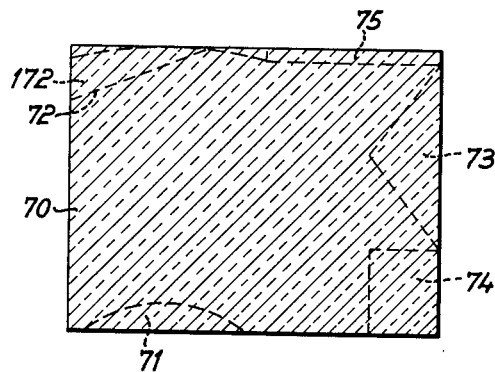
Figure 8:
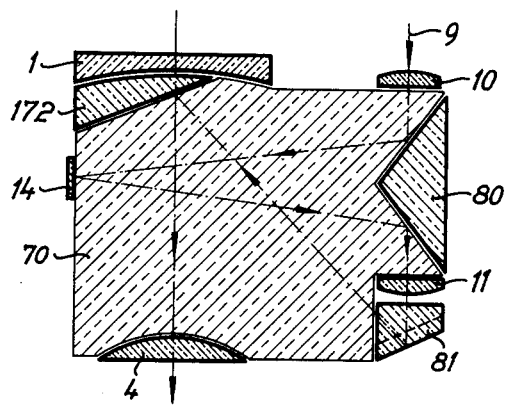

Figures 1, 2, 3, 4, 5, 6 and 6a diagrammatically illustrate modifications of the measuring finder embodying the present invention, in sectional view along the plane of the course of rays; and Figures 7, 7a and 8 diagrammatically illustrate two different phases of manufacture of a device embodying the invention.

Referring to the drawings, in the embodiment of the measuring finder shown in Fig. 1, parts 1, 2, 3 and 4 are the structural elements of a block type Albada viewfinder including the block 3 having the member 2 cemented thereto. A partially permeable mirror 5, for reflecting the measuring ray, is disposed in the cemented interface between parts 2 and 3 and has dimensions corresponding to a gap in the partially permeable concave mirror 6 provided in the cemented interface between part 1 and parts 2 and 3. Mirror 6 provides an image, at substantially infinity, of a picture limiting frame 7 which is in the cemented interface between the inner convex surface of eye-piece or ocular 4 and the mating concave surface of intermediate block 3, the frame 7 being disposed in substantially the focal plane of the mirror 6. Thus, an observer looking through the ocular 4, as indicated by the eye 8, sees the objective bounded by the image of the limiting frame 7.

Measuring ray 9 provides a second image of the objective which is superposed on the image seen directly through the viewfinder looking along the optical axis thereof. The rays forming this second image pass through lens 10, prism 12, block 16, intermediate block 3, mirror 14, which reflects the rays to prism 13 from where they pass through lens 11, are reflected by prism 15 to mirror 5, and reflected by mirror 5 along the optical axis of the viewfinder. The lenses 10 and 11 constitute the objective and the ocular of a telescope, with prism 15 erecting the image and the laterally correct position of the image being attained by the odd number of reflections.

The focal planes of both objective lens 10 and ocular lens 11 are located in the mirror 14, whose periphery limits the image field of the second image. Lens 11 is integrated with the prism 13 as by cementing. However, lens 10 is arranged displaceably in axial and lateral direction, whereby movement of this member serves for adjustment to coincidence in measuring the distance. Between the viewfinder intermediate block proper, comprising parts 3 and 2, and prisms 12, 13 and 15, the glass member 16 is inserted, the dimensions of which are selected in such manner that the entire length of the range finder base extends in glass and the focal length of its objective is larger than the base plus one-half of the width of the finder.

Fig. 2 illustrates an arrangement generally similar to Fig. 1, but in which erection of the image is effected by a Dove prism 17 disposed in advance of lens 10. In this case, a simple reflecting prism 18 is used instead of the roof prism 15 of Fig. 1.

Fig. 3 illustrates a range finder which is built substantially similarly to the range finder shown in Fig. 1, but which differs from Fig. 1 by the splitting of lens 10 (Fig. 1) into a positive and a negative member. The positive member 101 is cemented to prism 12 and the negative member 102 serves as the displaceable member for the measuring procedure. This arrangement has the advantage that by the selection of the individual refractive powers of these two members of the objective, the displacement can be better adapted to the mechanical requirements of the respective camera. Instead of the parts 3 and 16 provided in Figs. 1 and 2, only a single glass body 19 is used in Fig. 3, in order to further simplify the structure.

Fig. 4 illustrates a range finder, in which the course of the rays is similar to that in the embodiments previously described, but in which the individual glass parts forming the unitary body are arranged in a different manner. The dimensions of prism 120, for deflecting the measuring ray 9 to mirror 14, are so selected that prism 130 can be also cemented to surface 122 of prism 120, carrying mirror 121. This prism 130 has a notch 131 into which the ocular lens 111 of the measuring telescope is cemented. The roof prism 115 is so designed that it can be cemented to both the bottom surface of prism 130 and to glass block 3 of the finder body, so that the entire measuring finder is made into a compact structural unit. In this embodiment, as compared to that of Fig. 3, the negative lens of the range finder objective is fixed to the prism 120, while the positive lens of this objective is arranged as an adjustable part. This way it is possible to coordinate, in a known manner the optical parts with the mechanical transmission parts in accordance with their varying requirements.

The embodiment shown in Fig. 5 illustrates an example of a measuring finder with reducing optical effect, whereby the Newton finder is designed as an Albada finder in a manner known per se from the art. In the embodiment shown in Fig. 5, lens 1 has an extremely high index of refraction, while the other optical parts have a relatively low index of refraction in comparison with such high index. Thereby, at the cemented interface which carries the partially permeable mirror 6, a negative refractive power results, which, together with the convex lens 40, forms a reducing finder in a manner known per se. The arrangement shows a somewhat modified course of the rays, insofar as measuring ray 9 passes from objective 110 to mirror 14 for the real image plane, below the ray which is reflected from mirror 14 to ocular 40, so that an additional crossing of the paths of rays results between objective 110 and ocular 40. The ocular lens 40 of the Newton finder is thus also the ocular for the measuring telescope. Accordingly, the dimensions are so selected that mirror 14 is located in the focal plane of this ocular. In this embodiment of the invention, a prism 50 is cemented to the intermediate glass block 3 of the viewfinder, and carries a mirror 51 for reflecting rays, reflected by mirror 14, a roof prism 52 being also formed on the prism 50 and serving for erection of the image. A prism 53 is cemented to the surface of prism 50 carrying the mirror 51, being integrated with that portion of the surface not carrying the mirror 51. Prism 53 is relatively elongated and has a length corresponding to the focal length of ocular 40, and its free or outer end carries the reflecting mirror 54.

The embodiment of Fig. 6 illustrates, by way of example, a measuring finder with an enlargement ratio of 1:1. Its course of rays largely corresponds to the course in Figs. 1–4. However, there is a difference insofar as a concave mirror 55, instead of a lens, is used as the ocular. The image-erecting prism element 56 is arranged, in this case, on prism 57, which is arranged in the path of rays following objective 10, while prism 58, which follows mirror 14 in the path of rays, carries concave mirror 55, the focal plane of which is located at mirror 14. This arrangement results in a particularly compact design of the measuring finder, with the result that, after passing through displaceable lens 10, which is the objective, the measuring ray 9 passes through glass only and does not leave the glass block unitl it reaches the insight surface of the measuring finder. Losses of light due to reflection at the glass-air transit surfaces, and troublesome reflections at these surfaces, are thus avoided. It is also possible to provide the measuring finder according to Fig. 6 with a reducing effect. In such a case, the ocular lens 4 would have to be selected e.g., in conformity with lens 40 shown in Fig. 5, so that the telescope ocular is formed by the ocular lens of the Albada finder in combination with concave mirror 55.

Fig. 6a illustrates another embodiment of the invention involving the combination of a range finder with an Albada-view finder of the Newton-type. In this embodiment, the measuring finder consists essentially of the same optical parts as described in Fig. 6. Additionally, however, it contains an air lens, as known per se in Newton-view finders between front lens 1 and middle block 3, and also includes in place of the planoconvex ocular lens 4 of Fig. 6, a biconvex ocular lens 40 for the Albada-view finder, and which acts in connection with the concave mirror 55 as a reducing telescope within the range finder.

Figures 7, 7a and 8 illustrate a simple procedure for producing a measuring finder embodying the present invention, utilizing a compact regular hexahedral glass body. Fig. 7 shows the body in sectional view and Fig. 7a the same in perspective view. In this glass body, which is denoted 70 in Fig. 7, the following—indicated in dotted lines—are formed: spherical indentation 71 for receiving the frame-carrying body or ocular 4 of the Albada viewfinder; bevelled surface 72 to which is cemented the part 172 carrying a partially permeable mirror on its inner surface for reflecting the measuring ray and having the front number 1 of the Albada viewfinder cemented to its outer surface; a prismatic recess 73 on a lateral surface in which is mounted prism 80 for deflecting the measuring ray; an angular notch 74 in its eye facing surface for mounting the ocular lens 11 of the measuring telescope and a roof prism 81 for erecting the measuring image; and an angular recess 75, which is relatively shallow, on its object facing surface for displacement of the lens 10 thereover.

In addition to the foregoing, the glass body 70 has mounted thereon mirror 14, for limiting the measuring field, on the lateral surface opposite to prismatic recess 73, and front member 1 of the Albada finder, on the front surface turned to the object after spherical milling off of parts 172, 70. All of the beforementioned parts are shown in Fig. 8 after being applied to glass body 70. For the sake of clarity they are shown by heavier lines than glass body 70 proper.

It will be understood from the above that this invention is not limited to the specific designs, steps, arrangements and other specific details described above and illustrated in the drawings and can be carried out with various modifications without departing from the scope of the invention as defined in the appended claims.

What is claimed is:

1. A measuring finder constructed and arranged for pre-assembly followed by mounting as a unit into a photographic camera, said measuring finder comprising, in combination, an Albeda type viewfinder including a front optical member having a concave inner surface, intermediate block means to transparent material having a convex outer end surface mating with and cemented to said concave inner surface, and a concave inner end surface portion, an ocular member having a convex inner surface mating with and cemented to said concave inner surface portion, a first partially permeable mirror at the interface between said front member and said block means, and a picture limiting frame at the interface between said intermediate block means and said ocular in substantially the focal plane of said first mirror for imaging thereby at substantially infinity; and a measuring image forming, erecting and adjusting means including a plane mirror cemented to a first lateral surface of said block means and forming a measuring image limiting means, an objective having an axis parallel to and spaced laterally from the optical axis of the viewfinder and adjustable laterally relative to said optical axis, a second partially permeable mirror within said block means facing said frame and intersecting said optical axis at an acute angle, a first prism integral with said block means and having an end surface perpendicular to and intersected by the axis of said objective and a reflecting surface, laterally of a second lateral surface of said block means opposite said first lateral surface and oblique to the axis of said objective, to reflect rays entering through said objective to said plane mirror across said optical axis, a second prism means integral with said block means and having reflecting surface means laterally of said second lateral surface, and oblique to the axis of said objective, said reflecting surface means reflecting rays, reflected by said plane mirror across said optical axis, to said second partially permeable mirror for reflection by the latter through said ocular, ocular forming means integral with said block means and in the path of rays reflected by said plane mirror, an image erecting means in the path of light rays entering said objective; the focal planes of said objective and said ocular forming means lying in said plane mirror, and said objective and said ocular forming means conjointly providing a sharply defined measuring image to the same scale as, and in the plane of, the direct image provided by the Albada type viewfinder.

2. Measuring finder as claimed in claim 1, in which the intermediate block means project laterally beyond the other elements of the Albada finder and its dimensions are selected in such manner that the full base length of the range measuring portion of the finder extends in glass and the focal length of its objective is larger than the base plus one half of the width of the viewfinder.

3. Measuring finder as claimed in claim 2, in which the intermediate block means is composed of a first block having the width of the other elements of the Albada viewfinder and a second block cemented to said first block.

4. Measuring finder as claimed in claim 1, in which said second prism means comprises two prisms integral with said intermediate block means, and each including a reflecting surface forming part of said reflecting surface means.

5. Measuring finder as claimed in claim 4, in which one of said last-named prisms is designed as a roof prism and constitutes said image erecting means.

6. Measuring finder as claimed in claim 4 in which said image erecting means comprises a Dove prism in advance of said objective.

7. Measuring finder as claimed in claim 4, in which said three prisms are aligned along the axis of said objective; the intermediate prism having a base surface perpendicular to the axis of said objective; said ocular forming means comprising an ocular lens integral with said base surface.

8. Measuring finder as claimed in claim 4 in which said three prisms are aligned along the axis of said objective and said first prism is laterally aligned with the front member of the Albada viewfinder and has an outer surface a portion of which constitutes said reflecting surface of said first prism and another portion of which has integrally secured thereto the intermediate prism; the intermediate prism having a substantially rectangular outwardly opening notch including a first notch surface perpendicular to the axis of said objective and a second notch surface perpendicular to said first notch surface; said ocular forming means constituting an ocular lens secured to said first notch surface and intersected by the axis of said objective; said third prism being a roof prism constituting said image erecting means and being integrally cemented to said second lateral surface of said intermediate block means.

9. Measuring finder as claimed in claim 1, in which said first prism is laterally aligned with the front member of the Albada viewfinder and said second prism means includes a second prism arranged adjacent said first prism along the axis of said objective, said ocular forming means comprising a concave reflecting surface on a surface of the second prism; and the measuring ray reflected from the plane mirror to said concave reflecting surface is reflected by the latter to said second partially permeable mirror.

10. Measuring finder as claimed in claim 1 in which the Albada type viewfinder is a Newton viewfinder having a biconvex ocular which serves also as said ocular forming means; said second prism means including a second prism cemented to said second lateral surface of said block means, having free faces thereof forming reflecting surfaces constituting said reflecting surface means, and forming a roof prism constituting said image erecting means; said first prism being relatively elongated laterally of the Albada viewfinder and having an oblique inner surface cemented to one of the faces of said second prism having one of said last-named reflecting surfaces, and adjoining said one reflecting surface; said reflecting surface of said first prism forming a laterally outer end of the latter.

11. A measuring finder as claimed in claim 1, in which said first partially permeable mirror is interrupted over an area substantially centered on said optical axis; and said second partially permeable mirror is substantially coextensive with said interrupted area.

12. A measuring finder as claimed in claim 1, in which said objective includes a first lens integrally secured to said end surface of said first prism, and a second lens cooperating with said first lens and adjustable laterally of said optical axis.

13. A measuring finder as claimed in claim 12 in which said first and second lenses have unequal focal lengths.

14. A measuring finder as claimed in claim 12, in which one of said first and second lenses is a plano-convex lens and the other thereof is a plano-concave lens.

15. A measuring finder as claimed in claim 1, in which said intermediate block means includes a first block member having said first and second lateral surfaces, said concave inner end surface, and an outer end surface forming a portion of said convex outer end surface; and a second block member having an inner surface cemented to the remainder of the end surface of said first member and an outer surface constituting the remainder of said convex outer end surface and extending across said optical axis; said second partially permeable mirror being positioned at the interface between said first and second members.

References Cited in the file of this patent

UNITED STATES PATENTS

| | | |
|---|---|---|
| 2,805,608 | Leitz et al. | Sept. 10, 1957 |
| 2,896,500 | Kakunodate | July 28, 1959 |

FOREIGN PATENTS

| | | |
|---|---|---|
| 905,573 | Germany | Mar. 4, 1954 |
| 944,832 | Germany | June 21, 1956 |
| 209,360 | Switzerland | July 1, 1940 |
| 407,805 | Italy | Nov. 27, 1944 |